United States Patent
Bryan et al.

(10) Patent No.: US 11,132,847 B2
(45) Date of Patent: Sep. 28, 2021

(54) TIME TO EMPTY PREDICTION SYSTEM FOR VEHICLE POWER SOURCE

(71) Applicant: Ford Global Technologies, LLC, Dearborn, MI (US)

(72) Inventors: Seth Anthony Bryan, Royal Oak, MI (US); Ryan Hunt, Royal Oak, MI (US); Jordan Mazaira, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 16/355,206

(22) Filed: Mar. 15, 2019

(65) Prior Publication Data

US 2020/0294324 A1    Sep. 17, 2020

(51) Int. Cl.
| | | |
|---|---|---|
| *G07C 5/00* | (2006.01) | |
| *G06F 1/28* | (2006.01) | |
| *B60L 55/00* | (2019.01) | |
| *B60K 6/22* | (2007.10) | |

(52) U.S. Cl.
CPC .............. *G07C 5/004* (2013.01); *B60L 55/00* (2019.02); *G06F 1/28* (2013.01); *B60K 6/22* (2013.01); *B60Y 2200/91* (2013.01); *B60Y 2200/92* (2013.01)

(58) Field of Classification Search
CPC ........... G07C 5/004; B60L 55/00; G06F 1/28; B60K 6/22; B60Y 2200/91; B60Y 2200/92
USPC ......................................................... 701/123
See application file for complete search history.

(56) References Cited

U.S. PATENT DOCUMENTS

| | | | |
|---|---|---|---|
| 8,922,343 B2 | 12/2014 | Inagawa et al. | |
| 9,719,827 B2 | 8/2017 | Pruzina | |
| 9,792,552 B2 | 10/2017 | Hirschbold et al. | |
| 2005/0141154 A1* | 6/2005 | Consadori | H02J 3/005 361/62 |
| 2012/0193983 A1 | 8/2012 | Yukizane et al. | |
| 2015/0217655 A1* | 8/2015 | Sankaran | B60L 53/36 701/22 |
| 2016/0136747 A1 | 5/2016 | Trinkner | |
| 2018/0012091 A1* | 1/2018 | Ricci | G07C 5/0858 |

FOREIGN PATENT DOCUMENTS

| | | |
|---|---|---|
| JP | 2004254483 A | 9/2004 |
| JP | 2014115819 A | 6/2014 |

* cited by examiner

*Primary Examiner* — Gertrude Arthur Jeanglaude
(74) *Attorney, Agent, or Firm* — David B. Kelley; Brooks Kushman P.C.

(57) ABSTRACT

A vehicle includes an onboard power source, a vehicle interface, and a controller. The controller, responsive to an external power application drawing power from the onboard power source, outputs a power source time to empty for display by the vehicle interface. The power source time to empty is derived from a location of the vehicle and a power drawn from the onboard power source by the external power application.

16 Claims, 3 Drawing Sheets

TIME TO EMPTY PREDICTION SYSTEM FOR VEHICLE POWER SOURCE

TECHNICAL FIELD

This disclosure relates to time to empty calculations for vehicles including an onboard power source accessible for external power applications.

BACKGROUND

A vehicle power source, such as a generator, may be accessed for operation of external power applications. Currently, generators may not provide time to empty outputs and most portable generators onboard vehicles do not include fuel level indicators.

SUMMARY

A vehicle includes an onboard power source, a vehicle interface, and a controller. The controller, responsive to an external power application drawing power from the onboard power source, outputs a power source time to empty for display by the vehicle interface that is derived from a location of the vehicle and a power drawn from the onboard power source by the external power application.

A method for a vehicle includes, responsive to detecting a trigger event associated with an external power application in electrical communication with a power source of the vehicle, outputting to an interface of the vehicle a time to empty associated with the power source that is based on an identified type of the external power application, an estimated usage of the external power application, and a power level of the power source.

A method for a vehicle includes, responsive to an external power application drawing power from an onboard power source of the vehicle, outputting by a controller a power source time to empty for display by an interface of the vehicle that is derived from a location of the vehicle and a power drawn from the onboard power source by the external power application.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
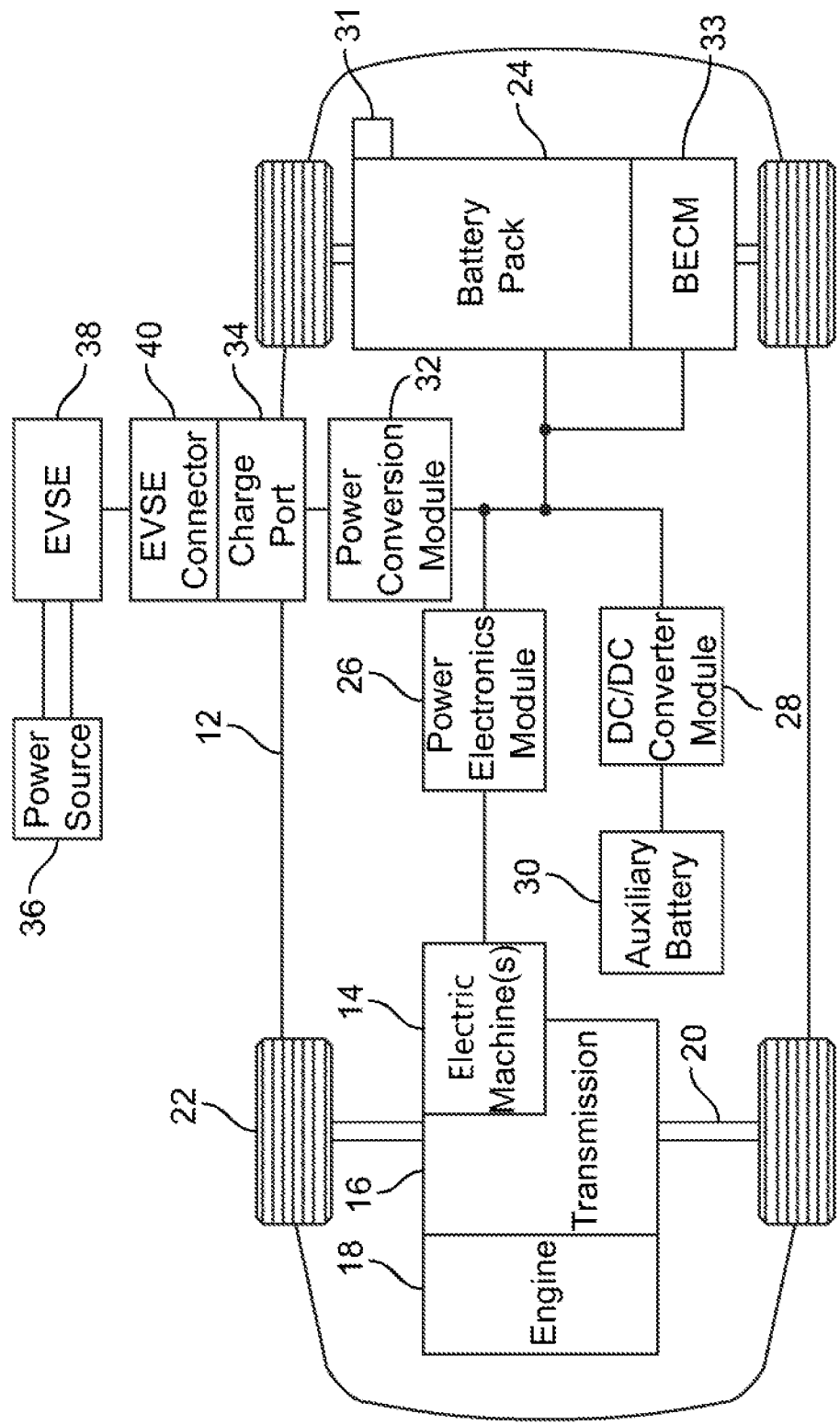
FIG. 1 is a schematic illustration of an example of a battery electric vehicle.

FIG. 1 illustrates a schematic representation of an example of an electrified vehicle. In this example, the electrified vehicle is a plug-in hybrid electric vehicle (PHEV) referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 may operate as a power source and may provide propulsion and deceleration capability when the engine 18 is turned on or off. The electric machines 14 may also operate to provide fuel economy benefits by recovering energy that would normally be lost as heat in, for example, a friction braking system.

A traction battery 24 stores energy that may be used by the electric machines 14 and other components of the vehicle 12. The traction battery 24 may provide a high voltage DC output from one or more battery cell arrays, sometimes referred to as battery cell stacks, within the traction battery 24. Each of the battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14 or other electrical components. In a regenerative mode, the power electronics module 26 may convert the three-phase AC voltage from the electric machines 14 acting as generators to the DC voltage required by the traction battery 24. Portions of the description herein are equally applicable to a pure electric vehicle that does not include an engine.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as those loads generated by compressors and electric heaters, may be connected directly to the high voltage without the use of a DC/DC converter module 28. In a typical vehicle, low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system to assist in managing a charge state of each battery cell of the traction battery 24. The traction battery 24 may have a temperature sensor 31 such as a thermistor or other temperature gauge. The temperature sensor 31 may be in communication with the BCEM 33 to provide temperature data regarding the traction battery 24.

The vehicle 12 may be recharged by an external power source 36 such as a source in communication with an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or onboard power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34. Accurately understanding energy consumption properties of various vehicle components is an integral part of estimating a time to empty (TTF) range of vehicles having an energy source, such as a fuel tank, electric machine, transmission system, or high-voltage battery.

Figure 2:
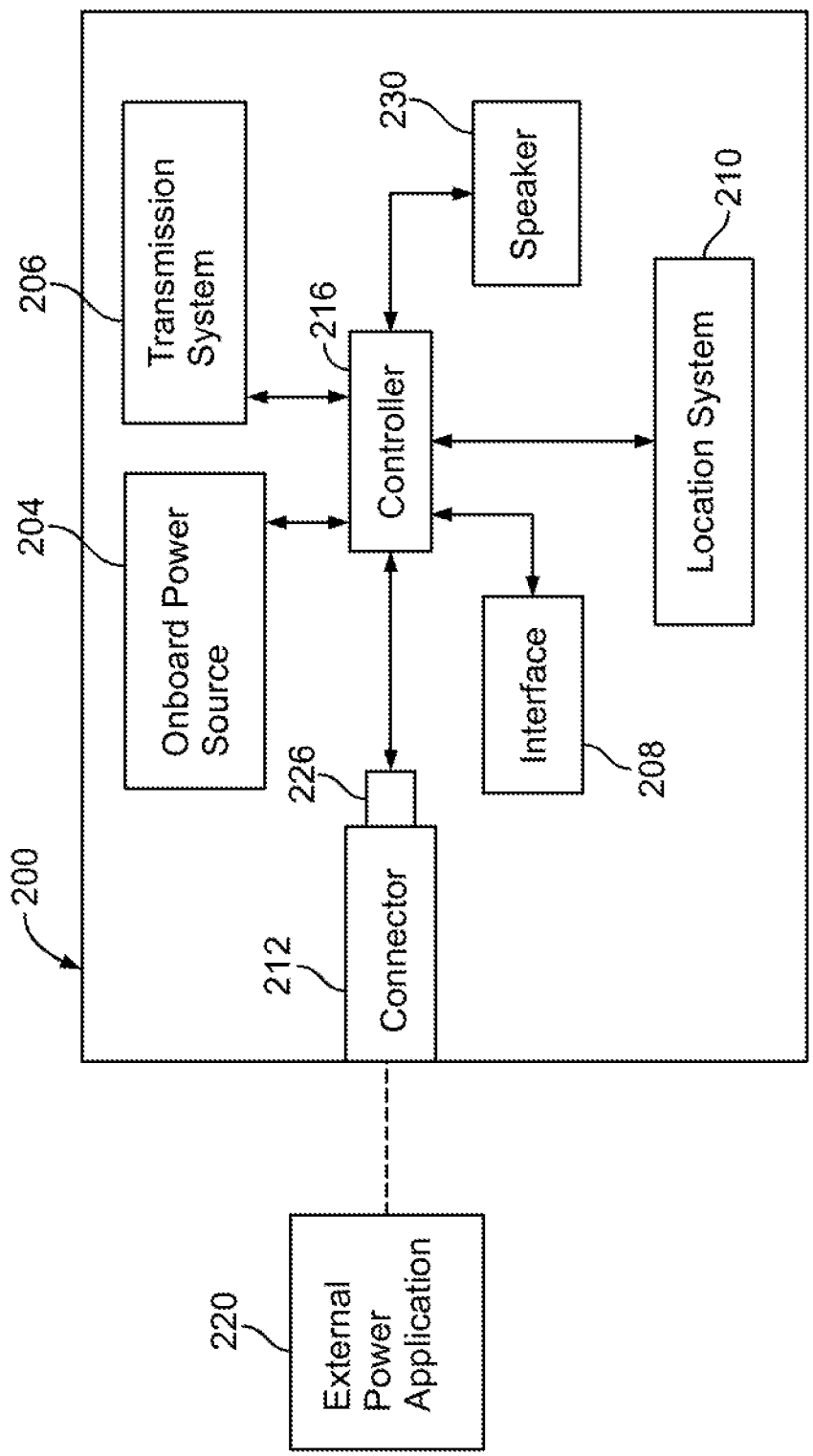
FIG. 2 is a schematic illustration of an example of a vehicle.

FIG. 2 illustrates an example of a vehicle including an onboard power source accessible for external power applications, referred to generally as a vehicle 200. The vehicle 200 may include vehicle components such as an onboard power source 204, a transmission system 206, an interface 208, a location system 210, a connector 212, and a controller 216. The onboard power source 204 may be, for example, an electric machine, a transmission system, or a portable generator. The transmission system 206 may include components to generate accessible energy. The interface 208 may be a touch screen or other similar unit to provide interconnectivity between a user and systems/components of the vehicle 200. In one example, the interface 200 may operate to display conditions of the vehicle 200 and provide the user with options to direct operation of systems/components of the vehicle 200 as related to TTE calculations for an external power application 220. The location system 210 may be a system, such as a GPS system, to identify a location of the vehicle 200 and/or to identify a desired destination and provide location information to the controller 216 for use in control strategies executed by the controller 216.

The connector 212 may assist in facilitating electrical communication between an external power application 220 and the onboard power source 204 or the transmission system 206 as described herein. In one example, the controller 216 may include programming to execute a control strategy to calculate an estimated TTE of the onboard power source 204 as related to operation of the external power application 220. Examples of the external power application 220 include power tools, home appliances, campers, or other devices requiring electrical power to operate.

Optionally, the vehicle 200 may include a sensor 226 in electrical communication with the connector 212 and the controller 216. The sensor 226 may operate to identify a type of the external power application 220 connected to the connector 212 and transmit the identified information to the controller 216. For example, the sensor 226 may identify the external power application 220 as a circular saw that was previously electrically connected to the connector 212 or identify an operational power draw expected from use of the circular saw based on an accessible table or saw operational history. The controller 216 may then utilize the identified information to assist in facilitating control strategies related to, for example, TTE calculations. Also, the controller 216 may operate the onboard power source 204 according to demands for power by the external power application 220. The power limits, for example, may be set higher responsive to the demands for power exceeding some threshold and set lower otherwise, etc.

Optionally, the vehicle 200 may include a speaker 230 in electrical communication with the controller 216. The controller 216 may include programming to output audio instructions to the speaker 230. In one example, the controller 216 may include programming to output audio via the speaker 230 as related to TTE calculations for the external power application 220.

Figure 3:
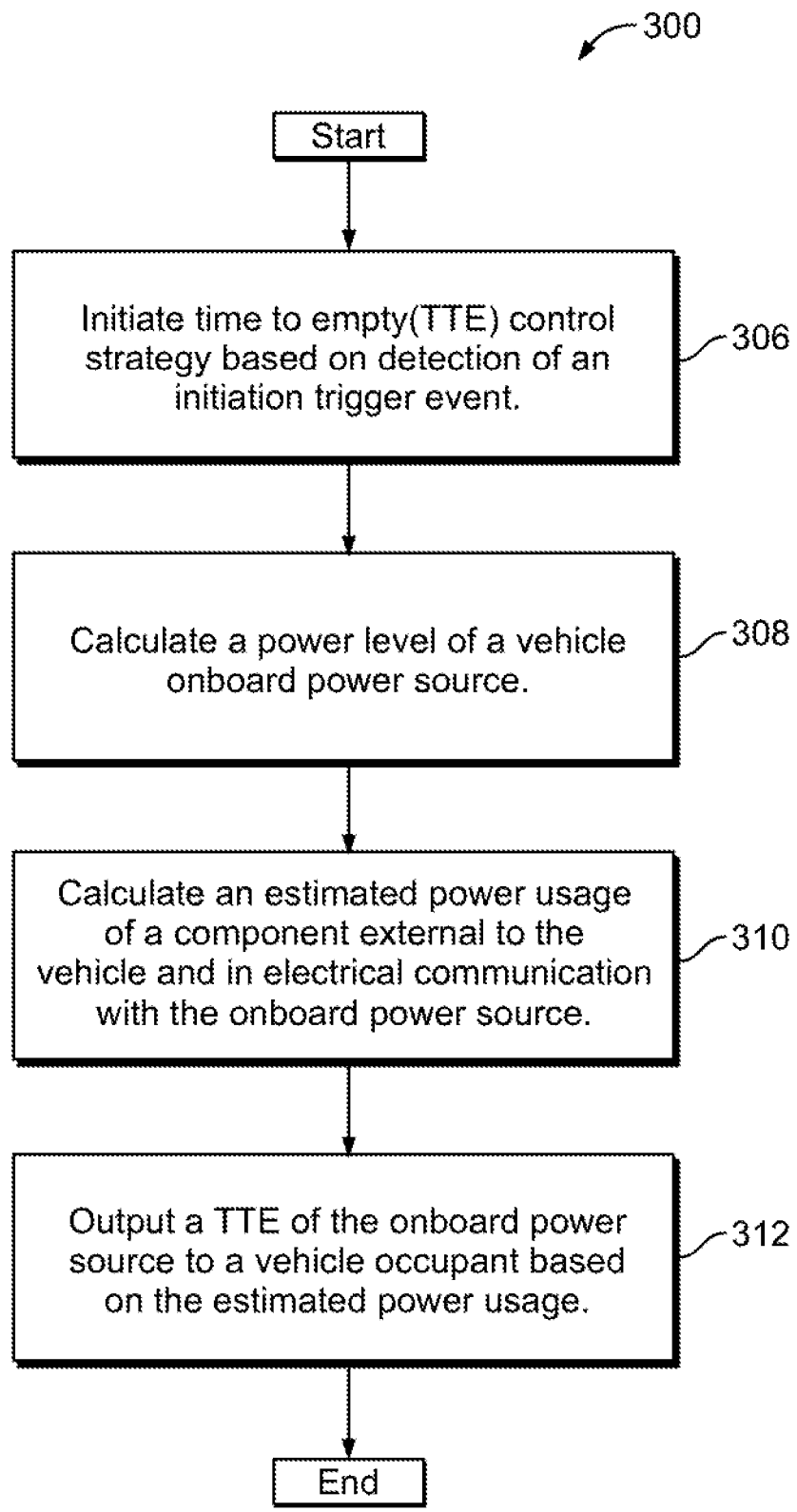
FIG. 3 is a flow chart illustrating an example of a control strategy for a vehicle to identify a time to empty for a vehicle power source.

FIG. 3 is a flow chart illustrating an example of a control strategy to calculate and output information relating to a TTE for an external power application, referred to generally as a control strategy 300. The control strategy 300 may be executed by a vehicle controller and operate with vehicle components.

In operation 306, a vehicle controller, such as the controller 216, may initiate a TTE control strategy based on detection of an initiation trigger. The TTE control strategy may operate to identify an estimated amount of time until a vehicle power source is depleted based on usage of an external power application electrically connected to the vehicle power source. One example of an initiation trigger is a connection of the external power application, such as the external power application 220, to a connector of the vehicle, such as the connector 212. Another example of an initiation trigger is a detection by a location system, such as the location system 210, of instructions to travel to an identified location in which an external power application was previously connected to the connector.

In operation 308, the controller may identify a power level of an onboard power source, such as an electric machine, the onboard power source 204 or the transmission system 206. The controller may then calculate an estimated power usage of the external power application in electrical communication with the onboard power source in operation 310. For example, the controller may access a table including predefined power usage of a particular external power application or may access a power usage history of the particular external power application if the external power application was previously electrically connected to the onboard power source.

In operation 312, the controller may direct output of a calculated TTE of the external power application to a vehicle interface, such as the interface 208. Alternatively, the controller may direct output of the calculated TTE of the external power application to a speaker, such as the speaker 230. Optionally, the controller may communicate with the location system to identify a distance between a current vehicle location and a desired vehicle destination. The controller may then calculate the TTE of the external power application based on an amount of fuel needed to travel between the current vehicle location and the desired vehicle location.

The processes, methods, or algorithms contemplated herein with respect to control of cooling fluids through the channels, control of voltage or current applied to semiconductor devices via the channels, etc. can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle comprising:
   an onboard power source;
   a vehicle interface; and
   a controller programmed to, responsive to detecting a power application remote from the vehicle drawing power from the onboard power source, output a power source time to empty for display by the vehicle interface that is derived from a location of the vehicle and a power drawn from the onboard power source by the power application.

2. The vehicle of claim 1, wherein the controller is further programmed to operate the onboard power source according to power limits that depend on demands of the power application.

3. The vehicle of claim 1, wherein the power source time to empty is further derived from a power level associated with the onboard power source.

4. The vehicle of claim 1, wherein the onboard power source is an electric machine or a generator.

5. The vehicle of claim 1, wherein the location is defined by input from a user.

6. The vehicle of claim 1 further comprising a sensor configured to detect a current or voltage associated with the power.

7. A method for a vehicle comprising:
   responsive to detecting a power application remote from the vehicle drawing power from a power source of the vehicle, outputting to an interface of the vehicle a time to empty associated with the power source that is based on an identified type of the power application, an estimated usage of the power application, and a power level of the power source.

8. The method of claim 7 further comprising detecting the identified type via output from current or voltage sensors.

9. The method of claim 7 further comprising operating the power source according to power limits that depend on the identified type.

10. The method of claim 7, wherein the time to empty is indicative of a distance between a current location of the vehicle and a desired destination of the vehicle.

11. The method of claim 7, wherein the time to empty is further based on an energy usage history associated with the vehicle.

12. A method for a vehicle comprising:
    responsive to a power application remote from the vehicle drawing power from an onboard power source of the vehicle, outputting by a controller a power source time to empty for display by an interface of the vehicle that is derived from a location of the vehicle and a power drawn from the onboard power source by the power application.

13. The method of claim 12 further comprising operating the onboard power source according to power limits that depend on demands of the external power application.

14. The method of claim 12, wherein the onboard power source is an electric machine or a generator.

15. The method of claim 12, wherein the location is defined by input from a user.

16. The method of claim 12, wherein the time to empty is further derived from a power level of the onboard power source.

* * * * *